July 22, 1930.  W. N. WILLIAMS  1,771,105
METHOD OF AND APPARATUS FOR JOINING TOGETHER STRIPS
OF FLEXIBLE OR SEMIFLEXIBLE MATERIAL
Filed Feb. 7, 1929  4 Sheets-Sheet 1

INVENTOR
W. N. WILLIAMS
BY
ATTY.

July 22, 1930.  W. N. WILLIAMS  1,771,105
METHOD OF AND APPARATUS FOR JOINING TOGETHER STRIPS
OF FLEXIBLE OR SEMIFLEXIBLE MATERIAL
Filed Feb. 7, 1929   4 Sheets-Sheet 2
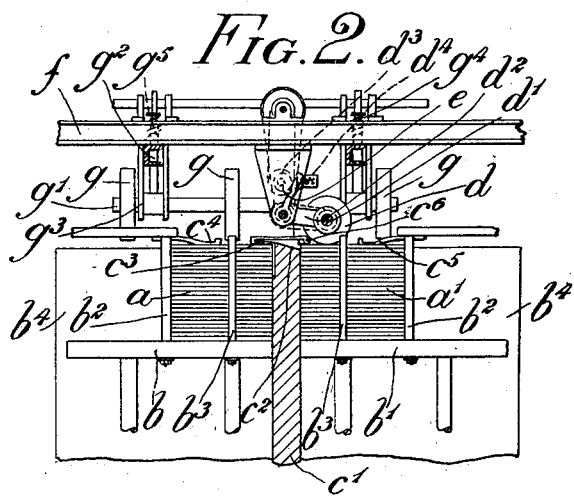
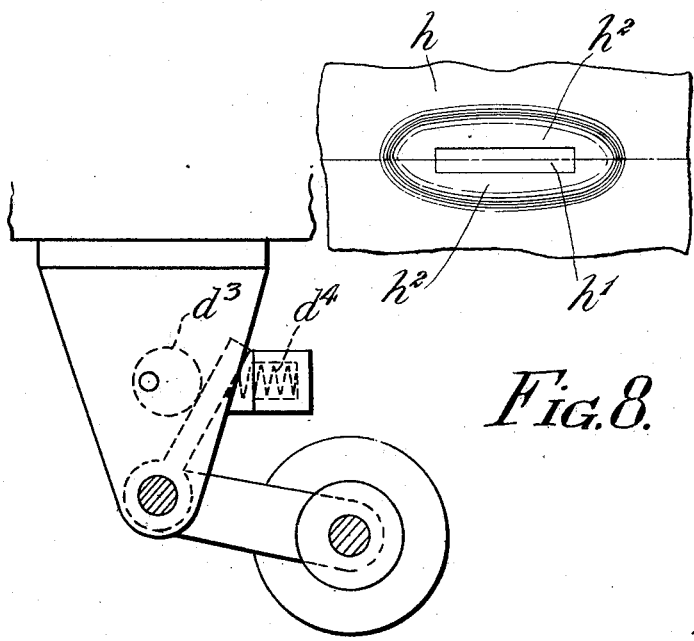

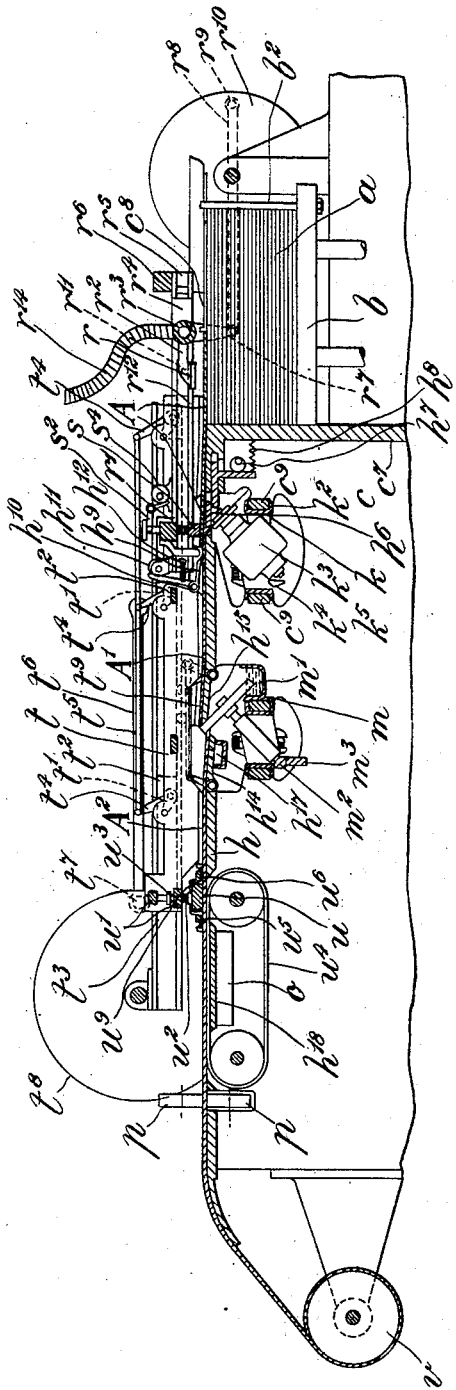

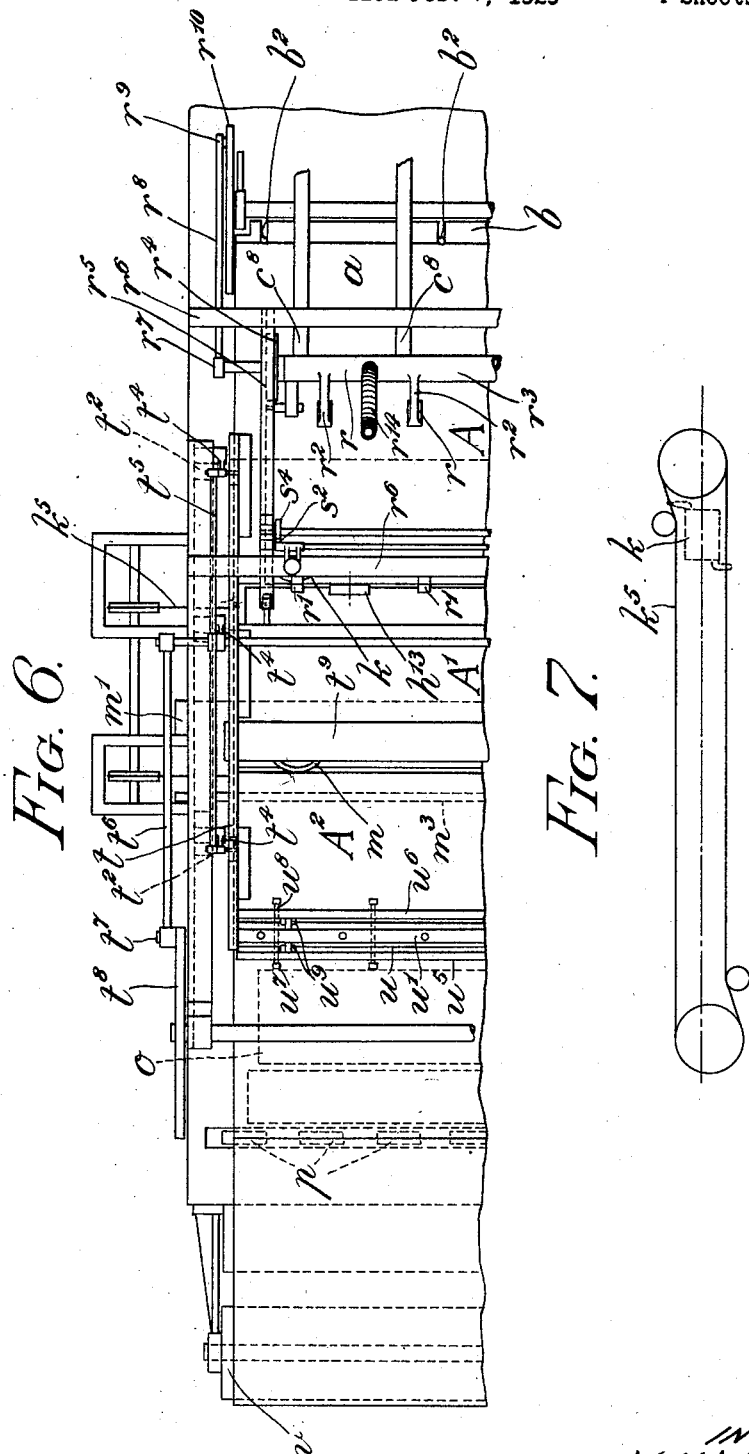

Patented July 22, 1930

1,771,105

UNITED STATES PATENT OFFICE

WALTER NATHAN WILLIAMS, OF LONDON, ENGLAND

METHOD OF AND APPARATUS FOR JOINING TOGETHER STRIPS OF FLEXIBLE OR SEMI-FLEXIBLE MATERIAL

Application filed February 7, 1929, Serial No. 338,315, and in Great Britain February 14, 1928.

This invention relates to an improved method of and apparatus for joining together, edge to edge, strips of flexible or semi-flexible material, and while of general application to materials such as plywood, leather, linoleum and the like, is especially applicable for jointing strips of veneer.

According to the usual method of jointing strips of veneer, the edges to be joined together are first cut or planed down straight and smooth, this being usually effected by clamping a package of veneer and cutting or planing the edge of the package by means of a rotary cutter or by means of a guillotine clipper. The strips of veneer are then separated and are matched together, the edges are pressed into contact and the strips fastened together at the joint with gummed tape. The strips are then folded back upon one another at the taped joint, the edges thus exposed are glued, the strips of veneer flattened out, the surplus glue scraped or wiped off, and pressure applied to the joint as by placing the strips with the taped side undermost in a cradle. All these steps are usually carried out by hand and require great skill to secure effective results. Furthermore, inasmuch as the strips to be joined together may not have been cut by the same operation and some time may have elapsed between the cutting of the edge of one strip and the edge of a strip to be matched to it, the edges to be jointed, when the strips are matched together, are very often not perfectly true and consequently in the finished product, the joint is imperfect and may be easily visible. Furthermore, in this known procedure it is practically impossible to secure an effective joint with bevelled edges.

In my prior British specification No. 269,336 I have described and claimed a straight-edge device for cutting the jointing edges of strips of material such as veneer whereby two strips of veneer having their edges overlapping are simultaneously cut by hand to form butt or bevelled edges by means of a cutting tool which is drawn along a longitudinal slot or guideway which prevents the knife from deviating.

A veneer jointing machine is already known wherein strips of veneer, having the edges to be jointed already cut and trued, are fed endwise therethrough and wherein the edges are automatically glued, pressed together and heated, thereby avoiding the taping operation before referred to.

The invention has among its objects to provide an improved method of and apparatus for joining together strips of material such as veneer without the operation of taping, and whereby accurate and even contact of the meeting edges throughout the length of the joint may be secured.

According to the present invention, the strips of material, such as veneer, to be joined together are simultaneously cut by cutting means adapted to sever the respective marginal portions of the strips at the edges to be joined in such manner that the cut edges forming the jointing faces exactly fit or match throughout the length of the joint, and then, without disturbing the longitudinal register of the strips, the cut edges are glued together with the application of pressure and, if necessary also, of heat. For example, the two strips to be joined together may be laid and held with their edges overlapping upon a suitable support conveniently in the form of a flat metal plate. The jointing edges are simultaneously formed by severing the marginal overlapping parts by means of a suitable cutting device which may be of the form described in my prior specification referred to, or may be in the form of a knife carried by a longitudinally movable slide, or a guillotine cutting device. Alternatively, a rotary disc cutter such as is in general use on cigarette making machines or a cutting knife in the form of a band, or a reciprocating blade cutter, may be utilized. After the cut, the upper severed marginal portion is removed by hand or by any suitable means, while the lower severed marginal portion may be allowed to fall by gravity through an opening in the supporting plate which may be formed, for example, by means of a hinged flap which is closed prior to and during the severing operation and opened to permit the discharge of the severed marginal portion. In place of a hinged flap a movable slide or other means may be provided to permit or to effect the removal of this severed marginal portion. An adhesive is then applied to the meeting edges of the strips as by means of a tongue or finger which may extend through the opening in the support through which the lower severed marginal portion is discharged, means being provided to raise the edge of one strip and/or to depress the edge of the other strip or to move the strips slightly away from one another to provide space for the tongue or finger by which the adhesive is applied to enter. After the application of the adhesive the hinged flap or equivalent device is closed and pressure is applied upon the two strips by any suitable means to hold them firmly together until the adhesive has set, whereupon the joint may be subjected to sanding and other finishing operations. The strips may be held in position on the support by means of clamps and the cutting device is preferably arranged so that the cutting edge is in a plane oblique to the plane of the strips so that bevelled edges may be produced. After the jointing process has been completed the strips may be formed into a roll. The support is preferably slidable so that the overlapping strips may be brought into position beneath a fixed knife, but alternatively, the support may be fixed and the knife may be movable. The support may be arranged to be displaced to remove the strips from the vicinity of the knife before gluing and pressing. It will be understood that according to the method hereinbefore described, the strips are maintained in determined relative position during the whole process so that thus perfect fitting of the edges may be ensured. The apparatus may be provided with automatic feeding mechanism of any suitable construction and may be adapted for the continuous jointing of strips of veneer which are fed laterally, step by step, as the sequence of operations is carried out.

Alternatively, according to a modification of machine more particularly adapted for continuous operation, the strips of veneer to be joined together may be fed from two piles or packages into position such that the edges to be joined overlap and the jointing edges or faces may be simultaneously formed by a single cutting element which may be vertical or inclined and may be in the form of a disc, band inclined or reciprocating knife or other suitable cutting device. Instead of a single cutting element, a pair of cutting elements in oppositely disposed positions may be provided so that the edges of the respective strips may be simultaneously and similarly cut without the necessity of first arranging the strips to overlap one another. The strips may be moved longitudinally with respect to a fixed cutting device or the strips may be held stationary and the cutting device moved longitudinally instead. Means are provided for applying adhesive to the edges shortly after they are cut and for applying pressure, and if necessary, heat to ensure the production of an effective joint. It will be understood that the gluing operation is preferably effected immediately after the cutting operation so that before the cut has been completed the cut edges are in part united. By such means accurate longitudinal register of the cutting edges and consequently a perfect joint throughout the length may be secured.

The invention further comprises the features hereinafter described.

The invention is hereinafter described by way of example with reference to the accompanying diagrammatic drawings, in which:—

Figure 2 is a cross-section on the line 2—2, Figure 1;

Figure 4 is a detail plan view of the means by which the edges are separated for gluing;

Figure 5 is a part sectional elevation of an alternative construction of machine according to the invention;

Figure 6 is a part plan view corresponding to Figure 5;

Figure 7 is a diagrammatic view illustrating the arrangement of chain drive by which the cutting and gluing devices are reciprocated across the machine, and Figure 8 is a detail view of the feed roller.

Figure 1:
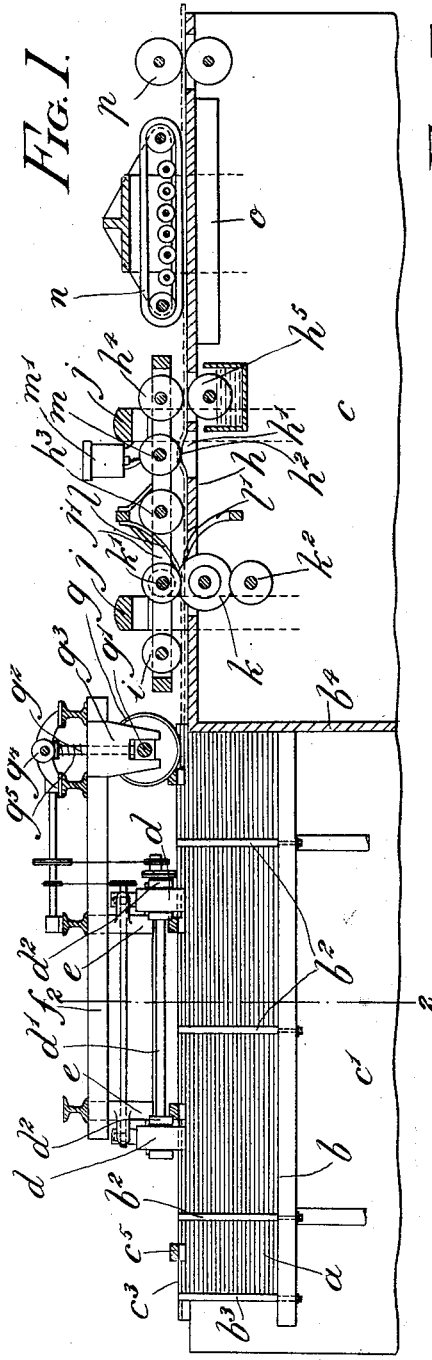
Figure 1 is a part sectional side elevation illustrating one construction of machine according to the invention.
Figure 3:
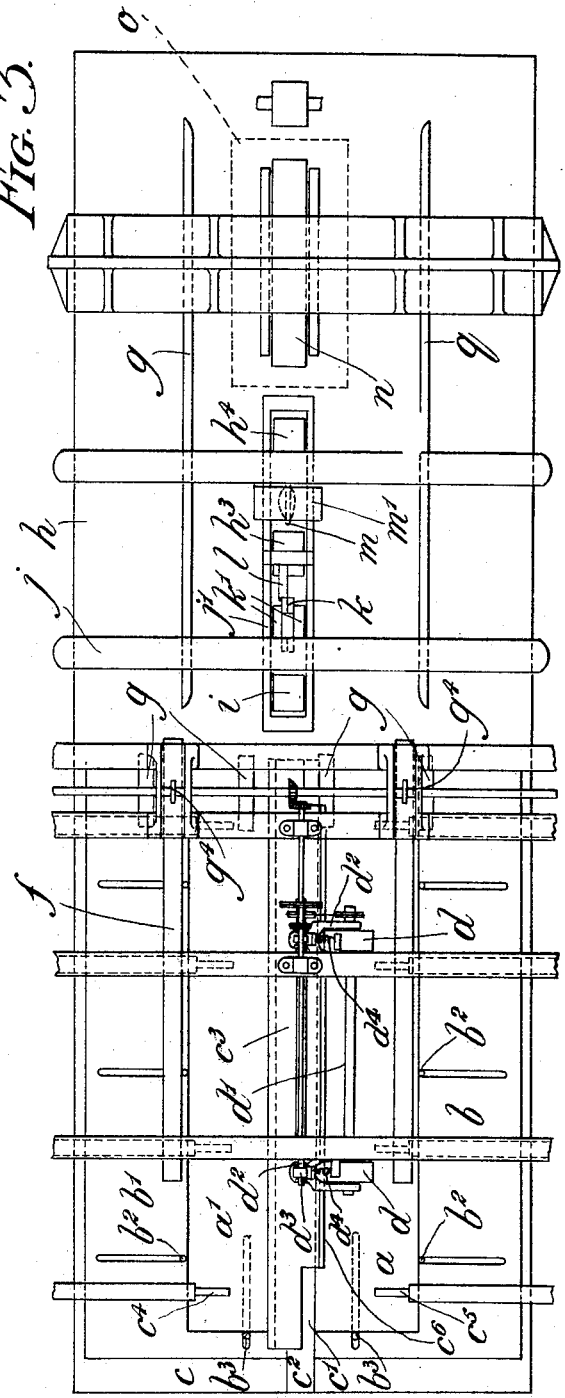
Figure 3 is a plan view corresponding to Figure 1.

In carrying the invention into effect according to one embodiment thereof, and with reference to Figures 1 to 4 of the accompanying diagrammatic drawings, the strips of veneer or other material to be joined together, edge to edge, may be disposed in two parallel piles or packages $a$ $a'$ which may be carried upon vertically movable platforms $b$, $b'$ respectively, adapted to be gradually raised as the strips are successively withdrawn from the top of the piles. These platforms may be disposed one on each side of a vertically disposed wall or partition $c'$ which may form part of, or be secured to the bed $c$ of the machine, and the piles $a$, $a'$ are positioned upon the respective platforms with their adjacent edge faces in contact with the respective sides of the wall or partition $c'$ by means of adjustable vertically disposed guides $b^2$ which conveniently may be fixed to extend upwardly from the platforms. The longitudinal position of the piles upon the platforms may be determined, for example, by adjustable guides $b^3$ at the outer ends of the platforms and fixed guides $b^4$ extending vertically in front of the platforms. In view of the springy nature of veneer which is generally slightly warped or buckled so that it will not lie flat, horizontally disposed stops or pressers may be provided to extend over and in contact with the upper surface of the uppermost strips on the piles so that the strips of each pile may be subjected to compression and the strips maintained substantially flat and more or less evenly in contact with one another. Such stops or presser members may be arranged as hereinafter described.

The central dividing wall or partition $c'$ may have its upper surface $c^2$ over the whole or the greater part of its length slightly inclined transversely so that one edge of the wall or partition is disposed substantially in the plane of the under surface of the uppermost strip on one pile, for example $a'$, while the other edge is disposed slightly above the upper face of the uppermost strip of the other pile $a$. A guide member $c^3$ or members comprising, for example, a flat plate of hook-shaped cross-section may be fitted to the top of the wall or partition $c^1$ so as to extend laterally from the top of the wall or partition at the side which is above the adjacent pile $a$ of strips, the extent to which the hook-shaped guiding plate $c^3$ projects laterally from the wall or partition $c^1$ determining the overlapping of the strips from the respective piles $a, a'$ before they are fed to the cutting device as hereinafter described. The under face of the hook-shaped guiding plate may, as shown, form one of the stops or presser members by which the strips in the pile $a$ are held in compression. The other stops or presser members may be constituted by adjustable plates or fingers $c^4, c^5$ mounted to extend inwardly from fixed supports and being preferably adapted to press resiliently upon the respective piles of strips adjacent their outer edges. The stop or presser member for the inner edges of the pile $a'$ of strips may consist of a longitudinal disposed rod or roller $c^6$ which may be carried on an extension of the hook shaped plate and is preferably adjustable according to the thickness of the material. The rod or roller may be replaced by pneumatic feeder mechanism.

In order to feed the uppermost strip on the pile $a'$ laterally into position so that its inner edge is disposed within the hook-shaped guide plate $c^3$ for the purpose described, two or more feed wheels or rollers $d$, which may have their peripheries covered with rubber or may be otherwise provided to insure effective frictional contact with the strip, may be mounted upon a longitudinally disposed shaft $d'$ which may be carried, for example, by means of bell crank levers $d^2$ which may be pivoted upon downwardly extending fittings $e$ carried by a suitable super-structure $f$. The feed wheels or rollers $d$ may be brought into contact with the upper strip on the pile $a'$ by means such as cams $d^3$ actuated periodically by any suitable mechanism and engaging with the bell crank levers $d^2$. The feed wheels or rollers $d$ may be periodically or intermittently rotated in any suitable manner, for example, by a suitable arrangement of chain drive and may be normally raised from the upper face of the uppermost strip on the pile $a'$ by means such as compression springs $d^4$. When the strip from the pile $a'$ has been fed laterally into the hook-shaped plate $c^3$, the feed wheels or rollers $d$ are raised and the strip may be maintained in the position to which it has been fed by means of the stops or pressers $c^5$, which may be adjusted so that their extremities snap down against the outer edge of the strip so fed.

In place of the feeding mechanism hereinbefore described any other suitable construction of mechanism may be utilized. For example, pneumatic picker mechanism such as used on printing machines may be adapted for the purpose and may be used alternatively or in addition to the mechanism hereinbefore described.

The uppermost strips from the respective piles $a, a'$ with the edge of the strip from the pile $a'$ overlapping the edge of the strip from the pile $a$ as described, are fed forward by suitable means such as feed rollers $g$ mounted upon a transverse shaft $g'$ disposed adjacent the forward end of the strips and supported so as to be capable of slight vertical movement as by suspending it from vertically disposed members $g^2$ reciprocable in guides $g^3$ carried by the super-structure $f$. The upper ends of the members $g^2$ may be adapted for engagement with springs $g^5$ or the equivalent whereby the feed rollers $g$ may be normally held out of contact with the strips, while the strip from the pile $a'$ is fed laterally, and when it is necessary or desirable to cease or interrupt the feed, means such as cams $g^4$ being provided to press the rollers $g$ into engagement with the strips to feed them longitudinally from the respective piles $a, a'$.

The overlapping strips are fed by the rollers $g$ on to a table $h$ and beneath a pressure roller $i$ which may be resiliently mounted in a central longitudinally extending support $j'$ carried, for example, on arms $j$ extending over the table from one side of the machine to the other. Immediately after passing beneath the presser roller $i$, the overlapping marginal portions of the strips pass over a longitudinal slot in the table $h$ through which a rotary disc or equivalent cutting device $k$ extends. The cutter is preferably in the form of a very thin disc of steel having a razor edge and held between supporting discs mounted upon a rapidly rotating shaft. A zinc roller may be provided above the table to contact with the edge of the cutter, or, alternatively, the peripheral edge of the cutter may extend between a pair of discs $k'$ by which the overlapping parts of the strip are maintained upon the table, and thus held to the cutter while the marginal portions are severed. The severed marginal portions may be removed in any convenient manner, for example, by providing upwardly and downwardly inclined guides $l$, $l'$ extending from a position just beyond the cutting device. The cutter is preferably so mounted that it may be adjusted to any desired angle with respect to the vertical plane of the joint and means such as grinding discs $k^2$ may be provided to keep the cutting edge sharp.

In order that the edges to be joined together, and which have been simultaneously cut, may be separated for the purpose of gluing, the table $h$ may be provided with a longitudinal slot $h'$ on either side of which the upper surface of the table is formed with humps $h^2$. Immediately in advance of these humps a presser roller $h^3$ may be provided, while a presser roller $h^4$ may be provided just beyond the humps. By such means the adjacent parts of the respective strips will be somewhat buckled in their passage over the humps $h^2$ and the edges will at this point be slightly separated sufficient to allow a gluing device, such as a wheel $m$ which may be disposed under or above the table and may be supplied with glue from a reservoir $m'$ by any suitable means, to enter between the edges. The presser roller $h^4$, by which the separated edges are again brought together, may be disposed above a slot in the table and may co-operate with roller $h^5$ which may be partially immersed in a liquid bath and may serve to remove surplus glue, a wiping device being provided, if necessary, for the upper roller $h^4$.

The glued edges may be subjected to pressure while the strips are still travelling forward by any suitable means, for example, by means of a presser member in the form of an endless belt or caterpillar track $n$ or by a series of rollers or the equivalent, and means such as a heater $o$ disposed beneath the table may be provided for applying heat to the edges while the pressure is maintained. The two strips glued together emerging from the pressing device $n$ may pass between a pair of sanding rollers $p$ or the equivalent by which the joint is finished. The heating device $o$ may be electrically heated. Suitable adjustable longitudinal guides $q$ may be provided to contact with the outer edges of the strips throughout the passages through the machine and pressure rollers or the equivalent may be provided to maintain the strips flat upon the table $h$ while the cutting, gluing, pressing and finishing operations are being effected.

When it is desired to join more than two strips together the feeding mechanism and guides may be adjusted so that pairs of strips already glued together may be joined to further strips or pairs of strips or the machine may be modified so that more than two strips are joined together simultaneously.

It will be understood that the invention is generally applicable to jointing materials such as leather, linoleum, plywood, etc., and, furthermore, the apparatus may be modified for jointing wooden boards and the like.

It will furthermore be understood that the invention is not limited to the details of construction hereinbefore described. For example, any suitable form of cutting device such as an endless band knife, a reciprocating blade or even a fixed blade, may be employed, while the gluing device may consist of a wick or brush or the equivalent. Furthermore, according to a modification, in place of feeding the strips in such manner that they are overlapped, they may be fed longitudinally and directly from the respective piles, the meeting edges cut by oppositely disposed and precisely similar cutting elements, and the strips then fed and pressed towards one another, for example, by means of obliquely arranged rollers or carrying tracks or the equivalent, the edges being conveniently glued before they are pressed together; or, in the case where the strips are held stationary while the edges are cut by movable cutting devices carried, for example, by a reciprocating carriage, the edges of the strips, after cutting, may be glued and the strips then fed laterally towards one another to bring the edges to be joined into engagement, the joint being then subjected to pressure and heat in any suitable manner and the jointed strips being removed laterally, and any desired number of strips being secured one to the other, step by step.

According to a further modification, the piles of strips may be disposed upon feeding platforms which are disposed at a slight angle to one another and the strips may be fed longitudinally from the piles in such manner that when they reach a determined point from the piles they overlap one another, the cutting device being disposed slightly beyond this point, and the strips, by reason of their inherent resiliency, continuing thereafter in parallel disposed positions with their jointing edges, which have been simultaneously cut pressed into contact with the another. The gluing, pressing and finishing mechanism may be as hereinbefore described.

Where the cutting device is disposed at an angle so as to produce bevelled jointing edges the gluing device may be similarly disposed at an angle, it being only necessary to separate the edges by raising and lowering the respective edges to a very small extent.

According to a further modification and with reference to Figures 5, 6, and 7 of the accompanying diagrammatic drawings, the strips $a$ of material such as veneer are disposed in a pile or pack upon a vertically movable platform $b$ disposed transversely at one end of the machine. The strips are held so that their longitudinal edges adjacent the machine are in contact with a vertical wall $c^7$ at the end of the machine bed $c$ by means of vertically disposed adjustable stops $b^2$. The strips may be pressed upon the platform $b$ by means such as stops $c^8$ which may be resiliently mounted. The uppermost strip of the pile $a$ is partially raised adjacent the leading edge by means of a pneumatic conveying device $r$ which picks up and carries the strip forwardly against fixed stops $r'$ and then releases it and allows it to fall in position with its leading edge overlapping the trailing edge of the previous strip. The pneumatic conveying device $r$ may comprise a suction bar or a plurality of nozzles carried by arms $r^2$ which are pivotally mounted upon a tubular shaft $r^3$ carried in slides $r^4$ reciprocable in longitudinal guides $r^5$ carried by transverse supporting members $r^6$ at the front and rear. The shaft $r^3$ may be fitted at one or both sides with a downwardly depending arm or lever $r^7$ which at its lower end is pivoted to a connecting rod $r^8$ which at the other extremity is connected to a crank pin $r^9$ upon a continuously or intermittently rotated wheel $r^{10}$. Just before the slides $r^4$ carrying the pneumatic conveying devices reach the rearward end of their travel, a pin $r^{11}$, which, during the major part of the reciprocation of the slides $r^4$ by the crank $r^9$, engaged upon the surface $r^{12}$ of the respective longitudinal guide $r^5$, is caused to pass through a slot in the lower flange of the guide $r^5$ by reason of the tension upon the arm $r^7$ or lever, so that the pneumatic head or nozzle is brought down into engagement with the upper strip on the pile $a$. At this moment the pneumatic nozzle is automatically connected to a source of suction, for example, by way of the flexible tubing $r^{14}$ and on continued movement of the crank $r^9$, so that the arm or lever $r^7$ is moved forwardly, the suction head is raised and carries with it the leading part of the strip until the pin $r^{11}$ has passed through the slot referred to, whereupon further angular movement of the arm or lever $r^7$ is prevented by a fixed stop and as a result of the continued movement of the crank $r^9$, the whole pneumatic conveying device moves forwardly in the longitudinal guides $r^5$. When the leading edge of the strip A engages with the fixed stops $r'$, the suction is cut off and the pneumatic head placed in communication with the atmosphere or even with compressed air so that the leading part of the strip A is caused to fall into a position as shown overlapping the trailing edge of the preceding strip A'. In order to hold the leading part of the strip A firmly in position while the overlapping parts of the strip are cut by the cutter $k$, a spring-pressed bar $s$ carried, for example, by vertically disposed rods extending through the front transverse member $r^6$, is released by the cam and lever mechanism $s'$, $s^2$. It will be understood that when the cut is completed and the strips are fed forward into position for the next operation, the bar $s$ is raised out of contact with the strip A.

The cutting device $k$ preferably consists of a disc of thin steel rotated at high speed and disposed at a suitable angle. Conveniently the disc $k$ may be mounted upon the extremity of a shaft of a high speed electric motor $k^3$ which may be fitted at the front and rear with slides $k^4$ engaging transverse guides $c^9$ extending through apertures $c^{10}$ in the lateral walls of the bed $c$. The reciprocation of the cutting device in the transverse guides $c^9$ may be effected by means of a continuously or intermittently rotating chain $k^5$, for example, in the manner illustrated diagrammatically in Figure 7, the cutting device moving in opposite directions in successive cuts. A suitable transverse slot is provided in the table $h$ for the passage of the cutting disc $k$. In order that the surplus strip at the rear edge of the strip A' may be removed or permitted to fall away, the table $h$ may be provided with a slidable section $h^6$ actuated, for example, by a cam $h^7$ and return spring $h^8$ in such manner that while supporting the trailing edge of the strip A' against the presser bar $s$ during the cutting operation, it may be moved rearwardly to allow the surplus part of the strip A' to fall away. The surplus part of the forward edge of the strip A may be projected forwardly, for example, by suitably actuated spring fingers or the equivalent, into a tray $h^9$ which is pivotally mounted at $h^{10}$ and actuated by a cam $h^{11}$ and return spring $h^{12}$ so that after having been lowered to receive the surplus part of the strip A, it may be raised so that the surplus part of the strip comes into contact with a transversely disposed rotating roller $h^{13}$ by which it is projected laterally out of the machine.

Before, or it may be after, the cutting operation as hereinbefore described, a pair of reciprocatable longitudinally disposed feeding members $t$ are brought rearwardly and caused to move downwardly into engagement with the upper surface of the strips A, A', and also with the preceding strip $A^2$ adjacent their lateral edges, and on completion of the cut and after the bar $s$ and the tray $h^9$ have been raised, the feed members $t$ are moved forwardly so as to carry the three strips forward a predetermined distance so that they are respectively in position for the next operation. The longitudinal feed members $t$ may be carried by means of cranks $t'$ which are journalled in slides $t^2$ reciprocatable in longitudinal guides $t^3$. Each of the cranks $t'$ is connected to an upwardly projected lever $t^4$, and the upper extremities of these levers are connected by rods $t^5$ so as to move in unison. The intermediate lever $t^4$ may be pivoted at its upper extremity to a transverse rod to which a connecting rod $t^6$ is pivoted, the other extremity of the connecting rod $t^6$ being pivoted to a crank pin $t^7$ carried by a continuously or intermittently rotated wheel $t^8$. The throw of the crank pin $t^7$ is such that after the levers $t^4$ have been moved forwardly to bring the feed members $t$ down into engagement with the respective strips, the feed members, together with the strips are moved forward to the necessary extent while, on continued movement of the crank pin $t^7$ the levers $t^4$ are moved rearwardly to raise the feed members $t$ out of engagement with the strips before the feed members $t$ move rearwardly into position for the next feeding operation. The feed members $t$ are held stationary either in the forward or rear position during the cutting and gluing. The strips having been moved forward one stage, the cut edges are glued by means of a gluing wheel $m$ which may be similarly mounted to the cutting device $k$ so as to reciprocate transversely across the machine and may dip into a trough $m'$ containing glue. The gluing wheel $m$ may be rotated, for example, by providing a bevel wheel $m^2$ or the equivalent at the lower extremity of the shaft upon which the wheel is mounted, which bevel wheel $m^2$ engages with a transverse rack or bar $m^3$. In order to separate the edges of the adjacent strips $A'$ and $A^2$ to permit the passage of the gluing wheel therebetween, the table $h$ may be provided with a pair of pivoted flaps $h^{14}$, $h^{15}$ which may be operated by interconnected levers $h^{16}$ in such manner that the flap beneath the leading part of the strip $A'$ is slightly raised while the flap beneath the trailing edge of the strip $A^2$ is slightly lowered. In order to hold the leading part of the strip $A'$ firmly upon the pivoted flap $h^{15}$ during the gluing operation, the feed members $t$ may be fitted with a transversely extending presser plate $t^9$, while the trailing part of the strip $A^2$ may be held upon the flap $h^{14}$ by means such as a suction nozzle $h^{17}$. It will be understood that while the cutting device $k$ is cutting one pair of strips, the preceding pair are being glued by the gluing wheel $m$.

On the next feed movement of the feed members $t$, the glued edges of the strips are brought into position for the application of pressure and heat. For this purpose a transverse presser member $u$ may be mounted so as to be capable of vertical movement in transverse members $u'$ extending between the feed members $t$. The presser member $u$ is pressed downwardly by means of springs $u^2$ while its downward movement, when the feed members $t$ are raised, is restricted by means such as collars $u^3$. It will be understood that on the next feed movement of the feed members $t$, the presser member $u$ remains in engagement with the strips, and, inasmuch as the pressure may be considerable, it may be necessary to provide means such as a conveyor belt $u^4$ travelling over a recessed part $h^{18}$ of the table to avoid undue friction. A heater $o$ may be provided beneath the table $h$, and if desired, the presser member $u$ also may be heated.

The presser member $u$ may be provided with means for drawing the edges of the strips together. For this purpose two bars $u^5$, $u^6$ may be mounted upon pins extending through the presser member $u$ so as to be disposed at the front and at the rear of the latter. The bars $u^5$, $u^6$, may be normally drawn together or towards the member $u$ by means of springs $u^7$, $u^8$ and their lower edges, which project slightly below the lower face of the member $u$, may be formed of resilient material such as soft rubber, or any other suitable means may be provided for enabling the members $u^5$, $u^6$, to give to the necessary extent when pressed upon the strips. The bars $u^5$, $u^6$ are normally held apart against the action of the springs $u^7$, $u^8$, by means such as bell crank levers $u^9$ arranged to form a toggle lever mechanism and connected at the toggle joint to a compression spring which is sufficiently strong to balance the springs $u^7$, $u^8$. When the member $u$ is brought down, the bars $u^5$, $u^6$ first engage the strips by reason of their resilient projecting under parts and immediately on such engagement the bell crank levers $u^9$ are retracted, for example, by engagement with a fixed stop or by a suitable cam and lever mechanism so that the bars $u^5$, $u^6$ are pressed towards one another by the springs $u^7$, $u^8$ and thus serve to draw the edges of the strips together before and while the member $u$ is pressed thereon.

The glued and pressed joint may be finished, for example, by subjecting it to the action of transversely disposed rotating and reciprocating sanding rollers $p$ or the equivalent and the strips joined edge to edge and issuing from the machine step by step under the action of the feed members $t$ may be wound upon a roller $v$ which may be rotated through a lightly loaded clutch or otherwise, so as to take up the jointed strips as the operations proceed. The roll so formed, consisting of a number of strips joined edge to edge, may be removed from the machine for transport or storage.

What I claim is:—

1. A method of joining together strips of flexible or semi-flexible material edge to edge, wherein the strips of material, such as veneer, to be joined together are simultaneously cut by cutting means adapted to sever the respective marginal portions of the strips at the edges to be joined in such manner that the cut edges forming the jointing faces exactly fit or match throughout the length of the join, and wherein, without disturbing the longitudinal register of the strips, the cut edges are secured together.

2. A method as claimed in claim 1, wherein the strips are cut through relative longitudinal movement of the strips and cutting mechanism.

3. A method as claimed in claim 1, wherein the respective strips to be joined are disposed with their edges overlapping and the jointing edges simultaneously cut by means of a single cutting element.

4. A method as claimed in claim 1, wherein the strips to be joined are automatically fed from piles or packages into position to be cut by the cutting device and in which the edges are glued together by automatically operating means.

5. A method as claimed in claim 1, wherein the strips are fed from separate parallel disposed piles in such manner that their edges are first caused to overlap and the overlapping strips then fed longitudinally to the cutting mechanism.

6. A method as claimed in claim 1, wherein the strips are fed laterally step by step through automatically operated jointing mechanism.

7. An apparatus for joining strips of flexible or semi-flexible material, comprising in combination cutting means adapted for simultaneously severing the marginal portions of the strips at the edges to be joined in such manner that the cut edges forming the jointing faces exactly fit or match throughout the length of the join, and means for gluing the jointing edges together without disturbing the longitudinal register of the strips.

8. Apparatus as claimed in claim 7, wherein the strips are fed longitudinally through cutting, gluing and pressing mechanism, substantially as described.

9. Apparatus as claimed in claim 7, wherein the strips are fed laterally through cutting, gluing and pressing mechanism, substantially as described.

WALTER NATHAN WILLIAMS.